United States Patent

[11] 3,601,614

| [72] | Inventor | George E. Platzer, Jr.<br>Southfield, Mich. |
|---|---|---|
| [21] | Appl. No. | 40,446 |
| [22] | Filed | May 25, 1970 |
| [45] | Patented | Aug. 24, 1971 |
| [73] | Assignee | Chrysler Corporation<br>Highland Park, Mich.<br>Continuation-in-part of application Ser. No.<br>713,883, Mar. 18, 1968, now abandoned. |

[54] AUTOMATIC ANTI-GLARE REARVIEW MIRROR SYSTEM
11 Claims, 9 Drawing Figs.

[52] U.S. Cl. .................................................... 250/209,
250/206, 307/311, 317/127, 356/279
[51] Int. Cl. ...................................................... H01h 39/12,
H01j 47/24, H03k 3/42
[50] Field of Search........................................... 250/208,
209, 210; 307/311; 317/127, 130; 350/279, 289

[56] References Cited
UNITED STATES PATENTS

| 2,758,508 | 8/1956 | Petri et al. ..................... | 350/289 X |
| 2,906,098 | 9/1959 | Mayo ............................ | 350/289 X |
| 2,912,593 | 11/1959 | Deuth............................ | 350/279 |
| 3,000,262 | 9/1961 | Rabinow et al. ............... | 350/289 X |
| 3,089,065 | 5/1963 | Worden......................... | 317/130 |
| 3,152,216 | 10/1964 | Woodward..................... | 317/130 X |
| 3,160,757 | 12/1964 | McAllise ....................... | 317/127 X |

*Primary Examiner*—James W. Lawrence
*Assistant Examiner*—T. N. Grigsby
*Attorney*—Talburtt and Baldwin ABSTRACT: Control circuit and system for changing an automotive rear view mirror between a day and a night reflective condition. The circuit includes a forwardly facing photocell for sensing ambient illumination and a rearwardly facing photocell for sensing the illumination on a mirror from the headlights of a following vehicle.

PATENTED AUG 24 1971 3,601,614

INVENTOR.
George E. Platzer, Jr
BY
Harness, Dickey & Baldwin
ATTORNEYS

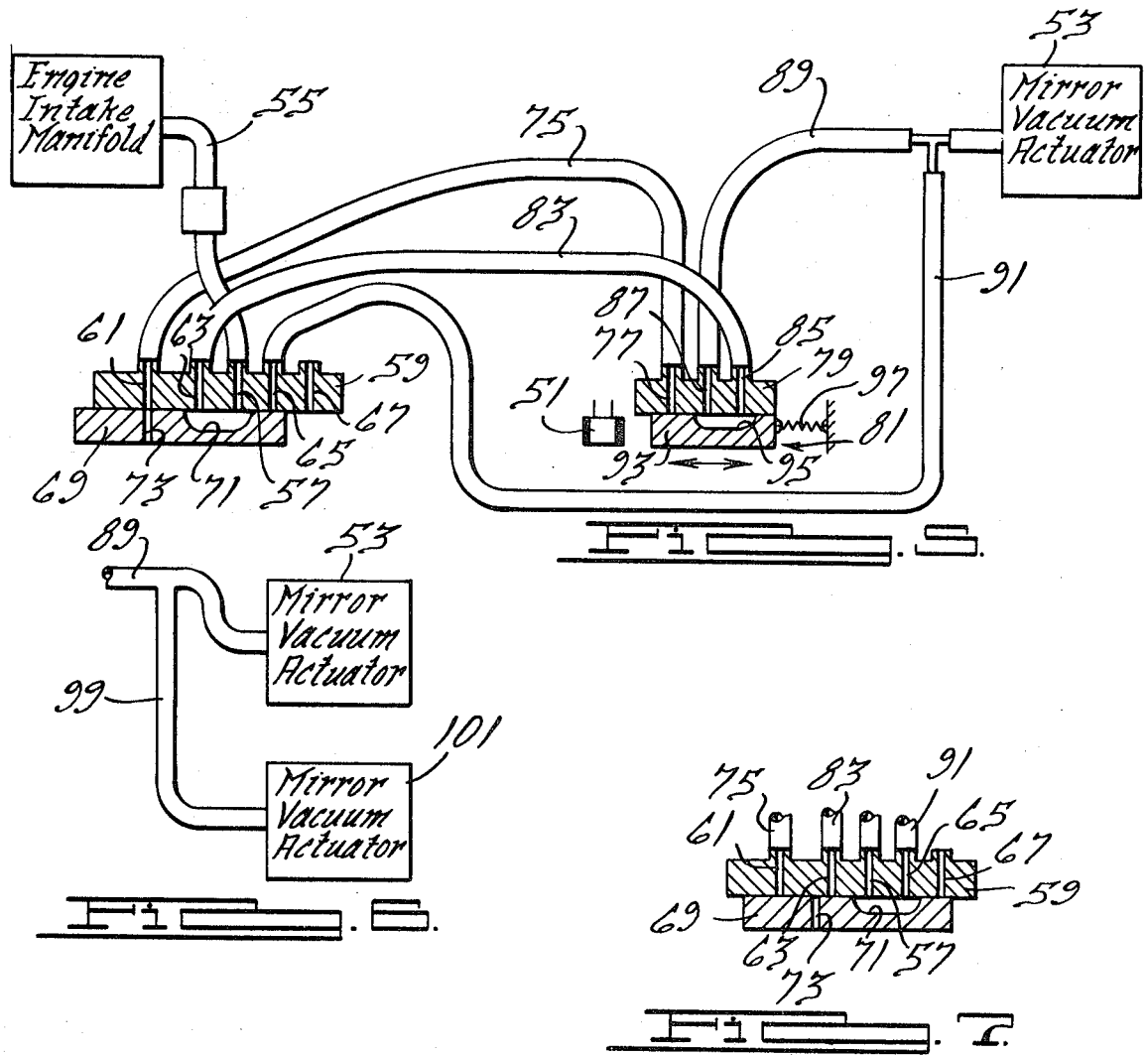
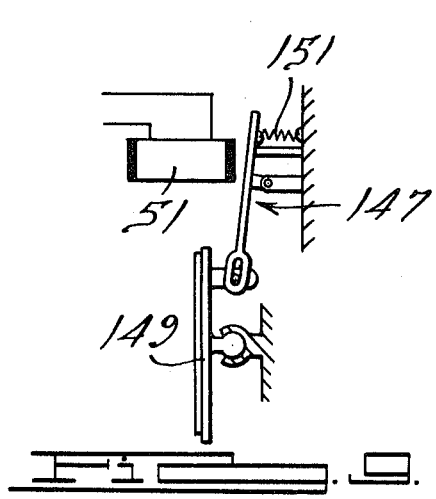
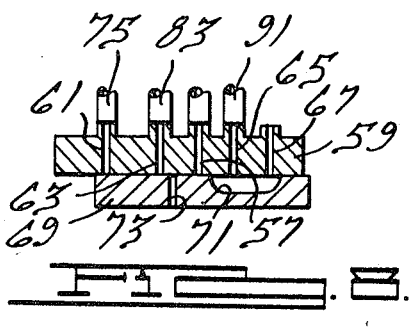

AUTOMATIC ANTI-GLARE REARVIEW MIRROR SYSTEM

BACKGROUND OF THE INVENTION

This is a continuation-in-part of application Ser. No. 713,883, filed Mar. 18, 1968 now abandoned.

This invention relates to motor vehicles and more particularly to an electrical circuit for control of a rear view mirror or mirrors, inside and/or outside, prismatic or fluid, for an automotive vehicle.

Rear view mirrors which are adapted to shift from one position to another in response to the light projected from a rearwardly approaching vehicle are well-known. Heretofore, the electrical circuits for operating these mirrors, which may be referred to as prismatic or fluid mirrors, depending on the construction thereof, have been something less than completely automatic in operation. This is because ambient illumination has a significant bearing on the glare from the rear which a driver considers tolerable. For example, in city driving, 0.1 foot-candle (ft.-c.) of illumination from the lights of a rearwardly approaching or following car may produce annoyance, while in the country as little as 0.01 ft.-c. may be uncomfortable. Moreover, at dusk drivers turn on their headlamps while the ambient illumination is still relatively high, and since most of the mirrors were connected to the headlamp electrical circuit, the mirrors would move to the night position when the drivers would prefer that they remain in the day position until the ambient illumination was reduced. In the past, automatic mirrors have overcome these problems by providing a sensitivity control and an auxiliary on-off switch, thus making the control circuit for such mirrors something less than automatic. The present invention eliminates the necessity for frequently manipulating any controls.

BRIEF SUMMARY OF THE INVENTION

Briefly, this invention relates to a control circuit for a mirror adapted to be placed in a day or a night reflective condition on an automotive vehicle. The circuit comprises first means for sensing the forward ambient illumination seen by the driver of the vehicle, second means for sensing the illumination on the mirror from the headlights of another vehicle following the first mentioned vehicle, an amplifier including means electrically connecting the first and second means in circuit, an electrical power source connected to the amplifier, on initiating device adapted to initiate a change in the reflectivity of the mirror from the first condition to the second condition by causing the mirror to be moved between a first and second position upon receiving a signal from the amplifier, the amplifier, when the illumination sensed by the second means bears a predetermined relationship to the illumination sensed by the first means.

One of the primary objects of this invention is to provide an electrical circuit for prismatic mirrors, fluid mirrors, or other variable reflectivity devices which is adapted to control automatically the position or condition of the mirror or mirrors regardless of ambient illumination.

Another object of this invention is to provide a circuit of the type described which requires very little adjustment of the sensitivity control mechanism for the circuit.

A further object of this invention is to provide a circuit such as described which is adapted to inhibit movement of the mirror or mirrors from one position to another as a result of high intensity fixed illuminating devices, such as street lights and store signs, for example.

Still another object of this invention is to provide a circuit of the class described which is economical in construction and effective in operation.

Other objects and advantages of this invention will be made apparent as the description progresses.

BRIEF DESCRIPTION OF THE DRAWINGS

In the accompanying drawings, in which several of various possible embodiments are illustrated.

FIG. 5 is a schematic view of a vacuum control apparatus adapted to be operated by either of the circuits shown in FIGS. 3 and 4;

FIG. 6 is a fragmentary view illustrating a modification of the FIG. 5 apparatus;

FIGS. 7 and 8 are fragmentary views of FIG. 5, showing certain parts in a moved position; and FIG. 9 is a schematic view of an electromechanical control apparatus adapted to be operated by either of the circuits shown in FIGS. 3 and 4.

Like parts are indicated by corresponding reference characters throughout the drawings.

DESCRIPTION OF THE PREFERRED EMBODIMENTS

Figure 1:
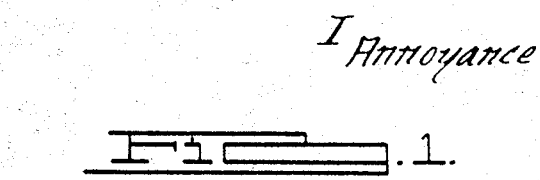
FIG. 1 is a graph generally illustrating the relationship between ambient illumination and the illumination of the headlamps of a following vehicle which may be tolerated.
Figure 2:
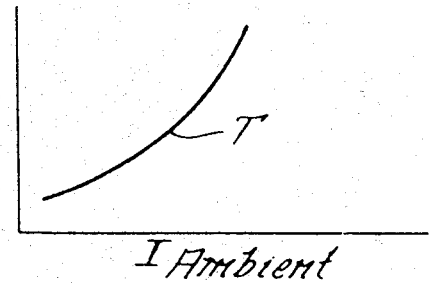
FIG. 2 is a schematic circuit diagram of one mirror control circuit.
Figure 2:
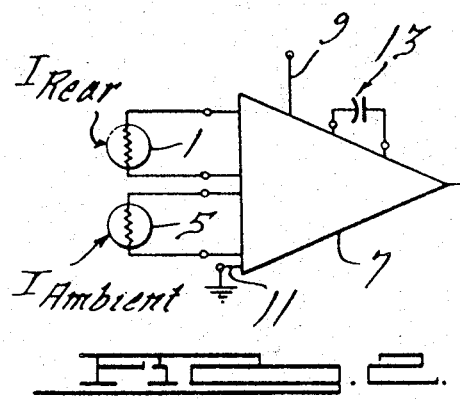

Referring now to the drawings, the line T in the FIG. 1 graph is generally thought to be representative of the illumination of the headlamps of a following vehicle which is tolerable to a driver under different ambient illumination conditions. It will be seen that as the ambient illumination increases, the illumination of the headlamps of a following vehicle may be increased without annoying the driver.

Generally, the circuit of this invention includes a first light sensitive device or photocell 1 adapted to sense the degree of illumination on a mirror, and a second light sensitive device or photocell 5 adapted to sense the degree of ambient illumination. Both photocells 1 and 5 are connected to a transistorized amplifier 7, connected by a line 9 to one terminal, such as the positive terminal, of the vehicle battery (not shown). A line 11 connects the amplifier 7 to ground. Amplifier 7 is connected to a mirror control apparatus 3 adapted to cause the change in reflective condition of the mirror from a "day" condition toward a "night" condition. This change in reflective condition may be accomplished in several ways. For example, the mirror could be of the type the reflectivity of which is varied when the electrical current applied to a component of the mirror is varied. Alternatively, and as shown herein, the mirror could be movable between a "day" and a "night" position. In such case the mirror control apparatus 3 is adapted to move a rear view mirror from a "day" position to a "night" position. A condenser 13 is connected to to 7.

As set forth above, the mirror control apparatus 3 may take various forms and the mirror or mirrors may be of the type in which reflectivity is varied by an applied voltage or the prismatic-type or the fluid-type, for example. Two forms of apparatus 3 are shown in FIGS. 5 and 7–9 and will be described hereinafter. However, it will be understood that other forms of control apparatus may be employed in connection with the circuits of this invention. In any apparatus 3 employed, one component thereof will be adapted to receive a signal from the circuitry for operating the apparatus to cause the reflective condition of the mirror to change. For the purposes of explanation, and the description of the circuit of this invention, it may be assumed that the aforenoted component or initiating device is an electromagnetic device.

Figure 3:
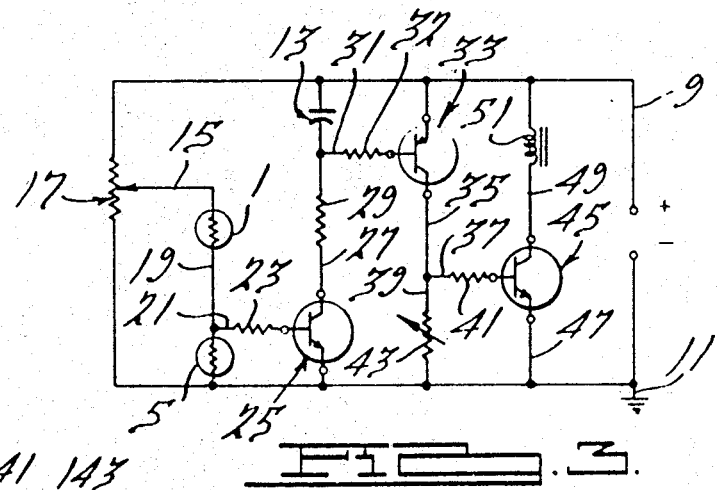
FIGS. 3 and 4 are two alternative circuits of this invention.

One embodiment of the circuit is shown in more detail in FIG 3. The photocell 1 is connected by a line 15 to a potentiometer 17 which is a sensitivity control available to the driver. This potentiometer would seldom be used, and then only to allow for variation among various drivers' individual annoyance levels. Potentiometer 17 acts as a voltage divider and changes the sensitivity of the circuit by changing the voltage applied to photocell 1.

Photocells 1 and 5 are connected together by a line 19, and a line 21, having a resistor 23 therein, joins line 19 to the base of a transistor 25. A line 27, having a resistor 29 therein, joins the collector of transistor 25 to condenser 13. A line 31 joins line 27, between resistor 29 and condenser 13, to the base of a transistor 33. Line 31 includes a resistor 32.

The collector of transistor 33 is connected by line 35 to lines 37 and 39. Line 37 includes a resistor 41 while line 39 includes a variable resistance 43. Line 37 is connected to the base of a transistor 45, the emitter of which is connected to a line 47. The collector of transistor 45 is connected to a line 49 which may include an electromagnet 51 forming part of a mirror control apparatus and adapted upon energization to cause the mirror to change between a day reflective condition and a night reflective condition by causing movement of the mirror between a day and night position. Transistors 25, 33 and 45 with their associated components comprise a direct coupled amplifier.

Photocell 1 is a rearward facing photocell used to detect illumination from a following vehicle. The photocell 5 is a forward facing photocell used to change the circuit sensitivity as a function ambient illumination. Photocell 5 and resistor 23 combine to form a current divider for the current flowing through photocell 1. Under conditions of very low ambient light, the resistance of resistor 23 is considerably less than the resistance of the photocell 5, and the majority of the current through photocell 1 goes to the base of transistor 25. If the ambient illumination is high, the resistance of photocell 5 will be low compared to the resistance of resistor 23, and the majority of the current through photocell 1 will be shunted to ground past the base of transistor 25. Hence, photocell 5 will act to continuously vary the current through photocell 1 and the gain of the amplifier so that it is inversely proportional to ambient illumination. When the illumination sensed by photocell 5 bears a predetermined relationship to the illumination sensed by the photocell 1 the current gain of the amplifier is sufficient to energize electromagnet 51. Potentiometer 17 permits variation of the relationship between the illumination sensed by photocells 1 and 5 necessary to cause energization of electromagnet 51.

Ambient illumination changes considerably over short distances because of the placement of street lights, street signs, and other fixed illumination. To avoid excessive operation of a mirror or mirrors in response to these conditions, it is necessary to provide a time delay in the circuit. Turn on delay is achieved by the time constant of condenser 13 and resistor 29 and the collector resistance of transistor 25. This delay will be short when the rear illumination illumination is high. Turnoff delay is primarily a result of condenser 13, resistor 32, and the input resistance of amplifying transistor 33. Resistor 29 is also instrumental in controlling turnoff time because it limits the voltage from which the condenser 13 can discharge. As used herein the term "turnon" means that condition of the circuit which causes energization of electromagnet 51, while the term "turnoff" means that condition of the circuit which results in deenergization of the electromagnet 51.

Resistor 41 and 43 combine to form a second current divider which is used as a gain trimmer. Resistor 43 would be set just once after assembly. A trimmer is required to take into account the normal variations in gain which will exist among transistors. Transistor 45 is a power transistor used to drive the electromagnet.

The circuit shown and described in FIG. 3 may be employed with the mirror control apparatus, 3, shown in FIG. 5, for example. This apparatus utilizes the engine intake manifold pressures for operation of a mirror actuator 53. As shown, the apparatus 3 includes a line 55 connected between the engine intake manifold and a port 57 in a switch body 59. Line 55 includes a check valve adapted to close when the pressure in the engine intake manifold is greater than the pressure in port 57.

Body 59 includes, in addition to port 57, ports 61, 63, 65 and 67. A slide control member 69 is adapted to move across certain of the aforenoted ports and includes a recess 71 adapted to permit two adjacent ports of the port group consisting of ports 63, 57, 65 and 67 to be placed in communication with one another depending upon the position of the slide control member 69. A port 73 is provided in control member 69 and is adapted to place port 61 in communication with the atmosphere when the control member 69 is in the position shown in FIG. 5.

Port 61 of switch body 59 is connected by a line 75 to a port 77 of another switch body 79 which forms part of an automatic control switch 81. Port 63 of body 59 is connected by a line 83 to a port 85 in body 79. A third port 87 is located in body 79 between ports 77 and 85. Port 87 is connected by line 89 to the mirror vacuum actuator 53. Port 65 of body 59 is connected by a line 91 to line 89.

An automatic slide control member 93 has a recess 95 therein adapted to place either ports 85 and 87 in communication with one another or to place ports 77 and 87 in communication with one another, depending upon the position of slide control member 93 relative to switch body 79. The member 93 is biased by a spring 97 to a position in which ports 85 and 87 are placed in communication with one another. The member 93 may be moved to a position wherein ports 77 and 87 are in communication with one another by electromagnet 51.

Assuming the slide members 69 and 93 are in the position shown in FIG. 5 so that the engine intake pressure, if less than atmospheric pressure, is applied to the mirror vacuum actuator 53, and the actuator, with such pressure applied to it, holds a mirror in the day position, operation of the circuit to control the mirror control apparatus 3 is as follows:

If the ambient illumination is high, such as during the time just preceding sunset, the resistance of forward facing photocell 5 is low relative to resistor 23, and the majority of the current through photocell 1 is shunted to ground past the transistor 25 to ground. Thus, the current passing through the circuit to the electromagnet 51 is insufficient to cause the latter to move slide member 93 from its FIG. 5 position. It will be seen that photocell 5 acts to continuously vary the gain of the amplifier so that it is inversely proportional to the ambient illumination.

When ambient illumination is low, such as during the night, the resistance of the forward facing photocell 5 is high relative to resistor 23, the majority of the current through the rearwardly facing photocell 1 goes to the base of transistor 25. If the illumination on the rearwardly facing photocell 1 is low, such as would occur when a following vehicle is considerable distance behind the vehicle having the described mirror and control system, the resistance of photocell 1 remains high and the current passing to the base of transistor 25 remains low. If the intensity of the illumination on photocell 1 increases to a predetermined level which will annoy the driver, the resistance of the photocell 1 is diminished to a point which permits the current passing to the base of the transistor 25 to be sufficient, after amplification by amplifier 7, to cause actuation of electromagnet 51.

Operation of the apparatus shown in FIG. 5 upon energization and deenergization of electromagnet 51 is as follows:

In the position shown in FIG. 5, the intake manifold pressure is applied to the mirror vacuum actuator 53 through line 55, port 57, recess 71, port 63, line 83, port 85, recess 81, port 87 and line 89. It will be assumed that when the intake manifold pressure is applied to the vacuum actuator, the latter will place the mirror in the daylight position.

Upon energization of the electromagnet 51 the member 93 is moved to the left as viewed in FIG. 5 so that recess 95 places port 77 in communication with port 87. The mirror vacuum actuator 53 is placed in communication with atmospheric pressure through line 89, port 87, recess 95, port 77, line 75, port 61 and port 73. The mirror may be biased by a spring, for example, which moves the mirror to the night position.

Thus, the actuator 53 is placed in communication with either the engine intake manifold pressure or atmospheric pressure depending upon the electrical mode of the electromagnet 51.

The circuit may be disabled in effect and the mirror vacuum actuator placed in conditions which either cause the mirror to be in the day or the night position. This is accomplished in the following manner:

The slide control member 69 is manually moved to the position shown in FIG. 7 if it is desired to place the mirror in the day position, i.e., if it is desired to place the mirror vacuum actuator in communication with the engine intake manifold pressure. This communication is established through line 55, port 57, recess 71, port 65, line 91 and line 81. Port 63 is closed by the control member 69. If the illumination on the photocells 1 and 5 is such that electromagnet 51 is energized, the member 93 will be moved to the left as viewed in FIG. 5. However, this merely places line 89 in communication with line 75 instead of line 83, and the port 61 connected to line 75 is also closed by member 69.

If it is desired to place the mirror in the night position, i.e., if it is desired to place the mirror vacuum actuator in communication with atmospheric pressure, the slide control member 69 is manually moved to the FIG 8 position. This places the mirror vacuum actuator in communication with atmospheric pressure through line 89, line 91, port 65, recess 71 and port 67. Again the position of slide member 93 does not alter this condition since the ports 61 and 63, respectively, connected with lines 75 and 83 are blocked by slide control member 69.

The mirror vacuum actuator 53 shown in FIG. 5 may be connected either to a rear view mirror located interiorly of the vehicle or to an outside mirror located on the side of the vehicle. However, it will be understood that if both an inside mirror and an outside mirror are provided on the vehicle and it is desired to operate both mirrors simultaneously between day and night positions, the apparatus may be easily adapted to perform such a function. In this regard FIG. 6 illustrates an example of such an adaptation. A branch line 99 is taken from line 89 to a second mirror vacuum actuator 101. The vacuum actuator 53 may control the operation of the rear view mirror inside the vehicle while the mirror vacuum actuator 101 may control the operation of a mirror located on the outside of the vehicle.

The circuit shown in FIG. 3 is adapted to vary the illumination sensitivity of an automatically controlled mirror as a function of ambient illumination. A variation of that circuit which uses a field effect transistor is illustrated in FIG. 4.

Figure 4:
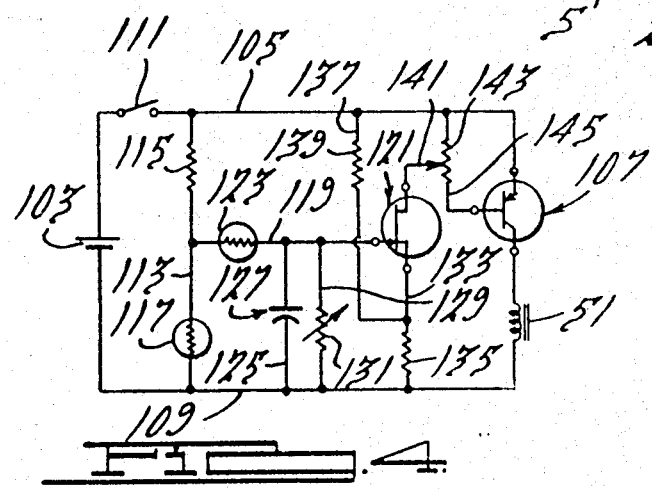

Referring to FIG. 4, the reference numeral 103 indicates an automotive vehicle power source, such as a battery. One terminal of battery 103 is connected by a line 105 to the emitter of a transistor 107. Line 105 includes a manually operable switch 111, while a line 109 connects battery 103 to an electric actuating device, such as electromagnet 51. A line 113 interconnects lines 109 and 111 and includes a resistor 115 and a photocell 117. Photocell 117 is a forward looking photocell, similar to previously described photocell 5, adapted to monitor ambient illumination. A line 119 interconnects line 113 at a point between resistor 115 and photocell 117 to the gate of a field effect transistor 121.

A rearwardly facing photocell 123, similar to previously described photocell 1, is provided in line 119. Photocell 123 is adapted to monitor the glare from following vehicles. A line 125 interconnects lines 109 and 119 and includes a capacitor or condenser 127. A second line 129 interconnects lines 109 and 119 and includes a variable resistance 131.

The source of field effect transistor 121 is connected by a line 133, which includes a resistor 135 to line 109. Line 105 is joined to line 133 by a line 137 which includes a resistor 139.

The drain of field effect transistor 121 is connected by a line 141 to a potentiometer 143 located in a line 145 connecting line 105 to the base of transistor 107.

The resistor 115 and the photocell 117 form a voltage divider which supplies the voltage for the photocell 123. Basically, the photocell 123 determines a photocurrent which develops a voltage across resistor 131. This voltage increases the current in the field effect transistor 121. Transistor 107 will amplify the field effect transistor current to energize the electromagnet 51 sufficiently to cause actuation of a mirror controlled thereby.

For all practical purposes, the field effect transistor 121 present an infinite resistance to resistor 131. Hence, the current in resistor 131 is equal to the voltage across photocell 117 divided by the sum of the resistances of resistor 131 and photocell 123. If the ambient illumination is low, the resistance of photocell 117 is high and the voltage across it is relatively high. This means that more voltage is available to produce a photocurrent in photocell 123, and the sensitivity of the circuit is high.

When the ambient illumination is high, the resistance of photocell 117 is low, and consequently the voltage across photocell 117 is low. This produces a decrease in sensitivity. Resistor 115 must obviously be sized so as to have a value about equal to the value of the resistance of photocell 1 at some mean ambient illumination.

Capacitor or condenser 127 is used to provide a time delay in the circuit. The time constant of resistor 131 and capacitor 127 should be on the order of 4 to 8 seconds. By making the resistor 131 variable it may be used as a sensitivity adjustment.

Resistors 135 and 139 function as a source of bias voltage for the field effect transistor 121. A current of between five and ten times the maximum required in the field effect transistor 121 flows in resistors 135 and 139. The resistor 131 applies the voltage across resistor 135 to the gate of the field effect transistor 121. In the absence of any photocurrent from photocell 123 the entire voltage applied between the gate and the source terminals of the field effect transistor 121 is the voltage across resistor 135. This bias voltage reduces the current through the field effect transistor essentially to zero. When there is a photocurrent, the drop across resistor 131 is in opposition to that across resistor 135, thereby increasing the current flow in the field effect transistor.

Potentiometer 143 is an overall gain trimmer which functions as a current divider. Its use is not essential, but it makes it possible to use a wide variation of transistor current gains while keeping resistor 131 essentially constant. Potentiometer 143 is a highly nonlinear gain control and could not be used for a sensitivity adjustment.

The circuit shown in FIG. 4 will cause energization and deenergization of the electromagnet 51 in response to the illumination both ambient and due to following vehicles on the photocells 117 and 123 so that a mirror or mirrors will be operated in a manner similar to that described with reference to the operation of FIG. 3.

It will be understood that the electric device 51 adapted to be energized and deenergized in response to various illumination conditions may be connected with mirror control apparatus other than that shown in FIGS. 5–8. In this regard the electromagnet 57 is shown in connection with a mechanical actuating device in FIG. 9. The mechanical actuating device shown is exemplary and includes a linkage 147 constructed in such a manner that a mirror 149 is moved from a day position to a night position upon energization of the electromagnet. A spring 151 is adapted to return the mirror to its normal day position upon deenergization of electromagnet 51.

It will thus be seen that the circuitry shown and described herein is adapted to control automatically the operation of any two position mirror, such as prismatic or fluid mirror devices, in response to the combined effects of glare from a following vehicle and ambient illumination.

In view of the foregoing, it will be seen that several objectives and other advantages of this invention are achieved.

Although several embodiments of the invention have been disclosed and described, it is apparent that other embodiments and modifications of the invention are possible within the scope of the appended claims.

1. A control circuit for a mirror movable between a first and second position on an automotive vehicle comprising first means for sensing the forward ambient illumination as seen by the driver of the vehicle, second means for sensing illumination on the mirror from the headlights of another vehicle following the first mentioned vehicle, an amplifier including means electrically connecting said first and second means in circuit, an electrical power source connected to said amplifier, an initiating device adapted to initiate movement of the mirror from said first position to said second position upon receiving a signal from said amplifier, when the illumination sensed by said second means bears a predetermined relationship to the illumination sensed by said first means over a range of ambient illumination and following vehicle headlight illumination conditions, sending said signal to said initiating device.

2. A control circuit as set forth in claim 1 further including adjustable sensitivity means electrically connected to said amplifier and said first and second means for varying the predetermined relationship, between the illumination sensed by the second means and the illumination sensed by said first means, necessary to cause said amplifier to send said signal to said initiating device.

3. A control circuit as set forth in claim 1 further including means for delaying the termination of the signal to said initiating device for a predetermined period of time after the illumination on said first and second means is such that said signal should be terminated.

4. A control circuit as set forth in claim 3, further including adjustable sensitivity means electrically connected to said amplifier and said first and second means for varying the predetermined relationship, between the illumination sensed by the second means and the illumination sensed by said first means, necessary to cause said amplifier to send said signal to said initiating device.

5. A control circuit as set forth in claim 1 wherein said amplifier includes a plurality of transistors connected together to form a direct coupled amplifier.

6. A controlled circuit as set forth in claim 1 wherein said amplifier includes a field effect transistor.

7. A control circuit for a mirror movable between a day position and a night position on an automotive vehicle comprising a first photocell for sensing the forward ambient illumination as seen by the driver of the vehicle, a second photocell for sensing the illumination on the mirror from the headlights of another vehicle following the first mentioned vehicle, an amplifier including means connecting said first and second photocells in circuit, an electrical power source connecting to said amplifier, an initiating device adapted to initiate movement of the mirror from the day position to the night position upon receiving a signal from said amplifier, when the illumination on said second photocell bears a predetermined relationship to the illumination on said first photocell over a range of ambient illumination and following vehicle headlight illumination conditions, sending said signal to said initiating device.

8. A control apparatus for a mirror movable between first and second positions on an automotive vehicle in response to a signal comprising first and second control valves, a line connected between said first control valve and the intake manifold of the engine of the automotive vehicle, a second line connecting said first control valve to said second control valve, a pressure actuated device for controlling movement of the mirror between said positions, a third line connecting said second control valve to said pressure actuated device, a fourth line connecting said second control valve to atmospheric pressure, said second control valve including a control member movable between a first position in which said second and third lines are placed in communication with one another to cause said pressure actuated device to be placed in communication with the intake manifold and a second position wherein said third and fourth lines are placed in communication with one another to cause said pressure actuated device to be placed in communication with the atmosphere, said control member being adapted to move between its said first and second positions in response to said signal.

9. A control system for a mirror movable between a day position and a night position on an automotive vehicle comprising a control circuit including a first photocell for sensing the forward ambient illumination as seen by the driver of the vehicle, a second photocell for sensing the illumination on the mirror from the headlights of another vehicle following the first mentioned vehicle, an amplifier including means connecting said first and second photocells in circuit, an electrical power source connecting to said amplifier, an initiating device adapted to initiate movement of the mirror from the day position to the night position upon receiving a signal from said amplifier, when the illumination on said second photocell bears a predetermined relationship to the illumination on said first photocell, sending said signal to said initiating device, first and second control valves, a line connected between said first control valve and the intake manifold of the engine of the automotive vehicle, a second line connecting said first control valve to said second control valve, a pressure actuated device for controlling movement of the mirror between said positions, and a third line connecting said second control valve to said pressure actuated device, a fourth line connecting said second control valve to atmospheric pressure, said second control valve including a control member movable between a first position in which said second and third lines are placed in communication with one another to cause said pressure actuated device to be placed in communication with the intake manifold and a second position wherein said third and fourth lines are placed in communication with one another to cause said pressure actuated device to be placed in communication with the atmosphere, said control member being adapted to move between its said first and second positions in response to said signal.

10. A control circuit for a mirror changeable between first and second reflective conditions on an automotive vehicle comprising first means for sensing the forward ambient illumination as seen by the driver of the vehicle, second means for sensing illumination on the mirror from the headlights of another vehicle following the first mentioned vehicle, an amplifier including means electrically connecting said first and second means in circuit, an electrical power source connected to said amplifier, an initiating means adapted to initiate a change in the reflectivity of the mirror away from said first condition toward said second condition upon receiving a signal from said amplifier, said amplifier, when the illumination sensed by said second means bears a predetermined relationship to the illumination sensed by said first means over a range of ambient illumination and following vehicle headlight illumination conditions, sending said signal to said initiating means.

11. A control circuit for a mirror changeable between a day and a night reflective condition on an automotive vehicle comprising first photocell means for sensing the forward ambient illumination as seen by the driver of the vehicle, second photocell means for sensing illumination on the mirror from the headlights of another vehicle following the first mentioned vehicle, an amplifier including means electrically connecting said first and second photocell means in circuit, an electrical power source connected to said amplifier, an initiating means adapted to initiate a change in the reflectivity of the mirror away from said day reflective condition toward said night reflective condition upon receiving a signal from said amplifier, said amplifier, when the illumination sensed by said second photocell means bears a predetermined relationship to the illumination sensed by said first photocell means over a range of ambient illumination and following vehicle headlight illumination conditions, sending said signal to said initiating means.